(12) United States Patent
Hajji et al.

(10) Patent No.: US 8,245,054 B2
(45) Date of Patent: Aug. 14, 2012

(54) SECURE AND CONVENIENT ACCESS CONTROL FOR STORAGE DEVICES SUPPORTING PASSWORDS FOR INDIVIDUAL PARTITIONS

(75) Inventors: Hassan Hajji, Yamato (JP); Seiichi Kawano, Sagamihara (JP); Masana Murase, Yokohama (JP); Susumu Shimetono, Hadano (JP)

(73) Assignee: Lenovo (Singapore) Pte., Ltd., Singapore (SG)

( * ) Notice: Subject to any disclaimer, the term of this patent is extended or adjusted under 35 U.S.C. 154(b) by 1492 days.

(21) Appl. No.: 11/213,222

(22) Filed: Aug. 26, 2005

(65) Prior Publication Data

US 2006/0075476 A1     Apr. 6, 2006

(30) Foreign Application Priority Data

Aug. 27, 2004 (JP) ................. 2004-249115

(51) Int. Cl.
*G06F 11/30* (2006.01)
(52) U.S. Cl. ............... 713/193; 713/183; 726/5
(58) Field of Classification Search .......... 713/193, 713/2, 182, 183; 726/2, 5, 6
See application file for complete search history.

(56) References Cited

U.S. PATENT DOCUMENTS

| | | | |
|---|---|---|---|
| 6,950,523 B1 * | 9/2005 | Brickell et al. | 380/286 |
| 7,054,990 B1 * | 5/2006 | Tamura et al. | 711/103 |
| 7,200,761 B1 * | 4/2007 | Freeman et al. | 713/184 |
| 7,370,166 B1 * | 5/2008 | Ramesh et al. | 711/163 |
| 2002/0116648 A1 * | 8/2002 | Tran | 713/202 |
| 2003/0188201 A1 * | 10/2003 | Venkataramappa | 713/202 |
| 2004/0117309 A1 * | 6/2004 | Inoue et al. | 705/50 |
| 2005/0138399 A1 * | 6/2005 | Cheston et al. | 713/189 |

FOREIGN PATENT DOCUMENTS

| | | | |
|---|---|---|---|
| GB | 2365544 A | * | 2/2002 |
| JP | H10-187618 | | 7/1998 |
| JP | H11-024934 | | 1/1999 |
| JP | H11-212922 | | 8/1999 |
| JP | 2000-215167 | | 8/2000 |
| JP | 2001-023353 | | 1/2001 |
| JP | 2001-051904 | | 2/2001 |
| JP | 2001-290776 | | 10/2001 |
| JP | 2002-507025 | | 3/2002 |
| JP | 2002-229859 | | 8/2002 |
| JP | 2003-006048 | | 1/2003 |
| JP | 2003-304326 | | 10/2003 |
| JP | 2004-506258 | | 2/2004 |
| JP | 2004-078539 | | 3/2004 |
| JP | 2004-086765 | | 3/2004 |
| JP | 2004-200845 | | 7/2004 |

* cited by examiner

*Primary Examiner* — Samson Lemma
(74) *Attorney, Agent, or Firm* — Ference & Associates LLC

(57) ABSTRACT

An information processing apparatus includes a storage device having an access-restricted area accessible if the password is properly authenticated and an access-unrestricted area accessible regardless of whether or not the password is authenticated. The information processing apparatus allows a password to be registered in a registration server beforehand, prompts a user to enter the password when accessing the access-restricted area and, if the password is not entered, reads from the access-unrestricted area a password retrieval program for retrieving the password from the registration server, activates and executes the password retrieval program to retrieve the password from the registration server, and causes the storage device to authenticate the retrieved password to place the access-restricted area in an accessible state.

4 Claims, 8 Drawing Sheets

[Figure 1]
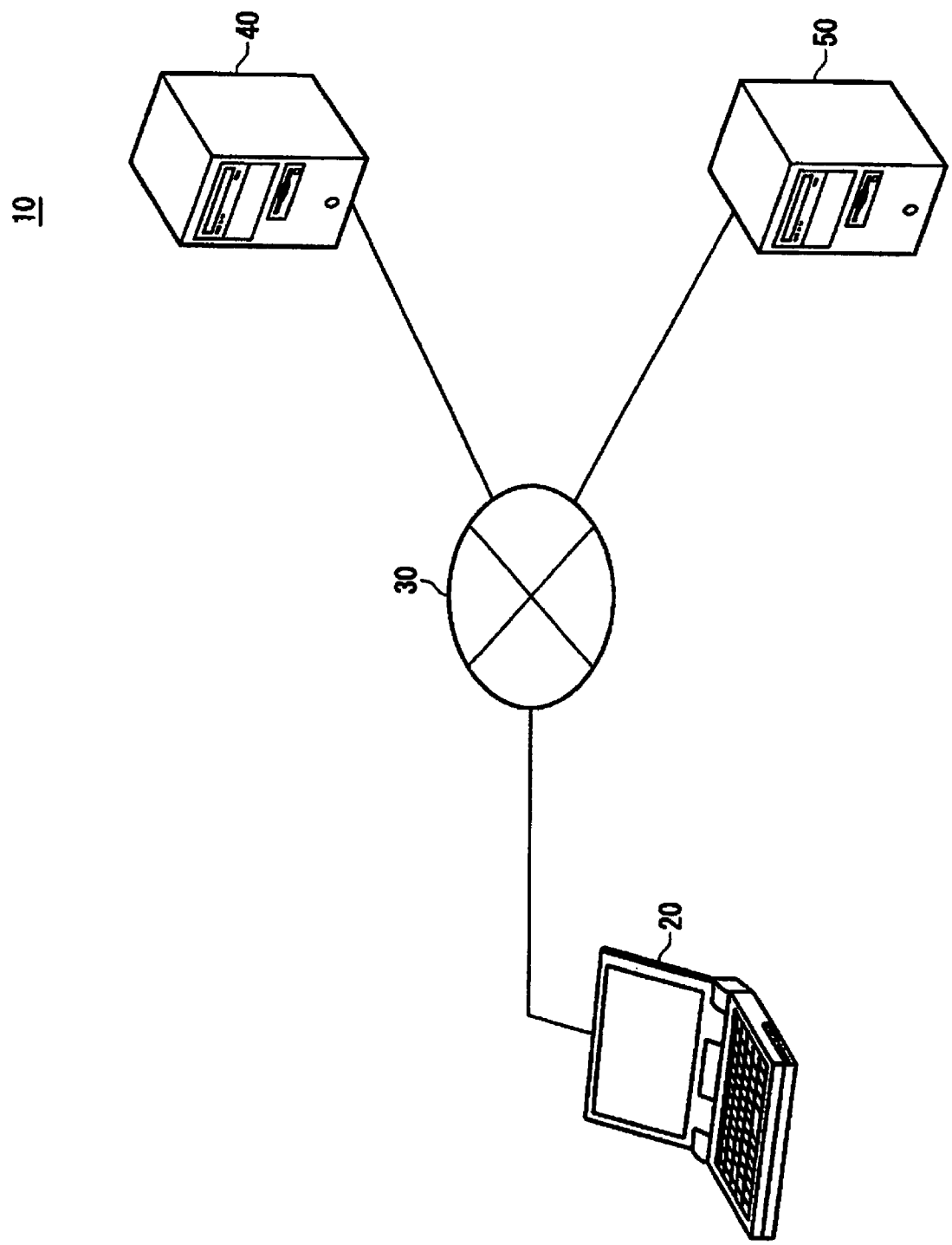

[Figure 2]
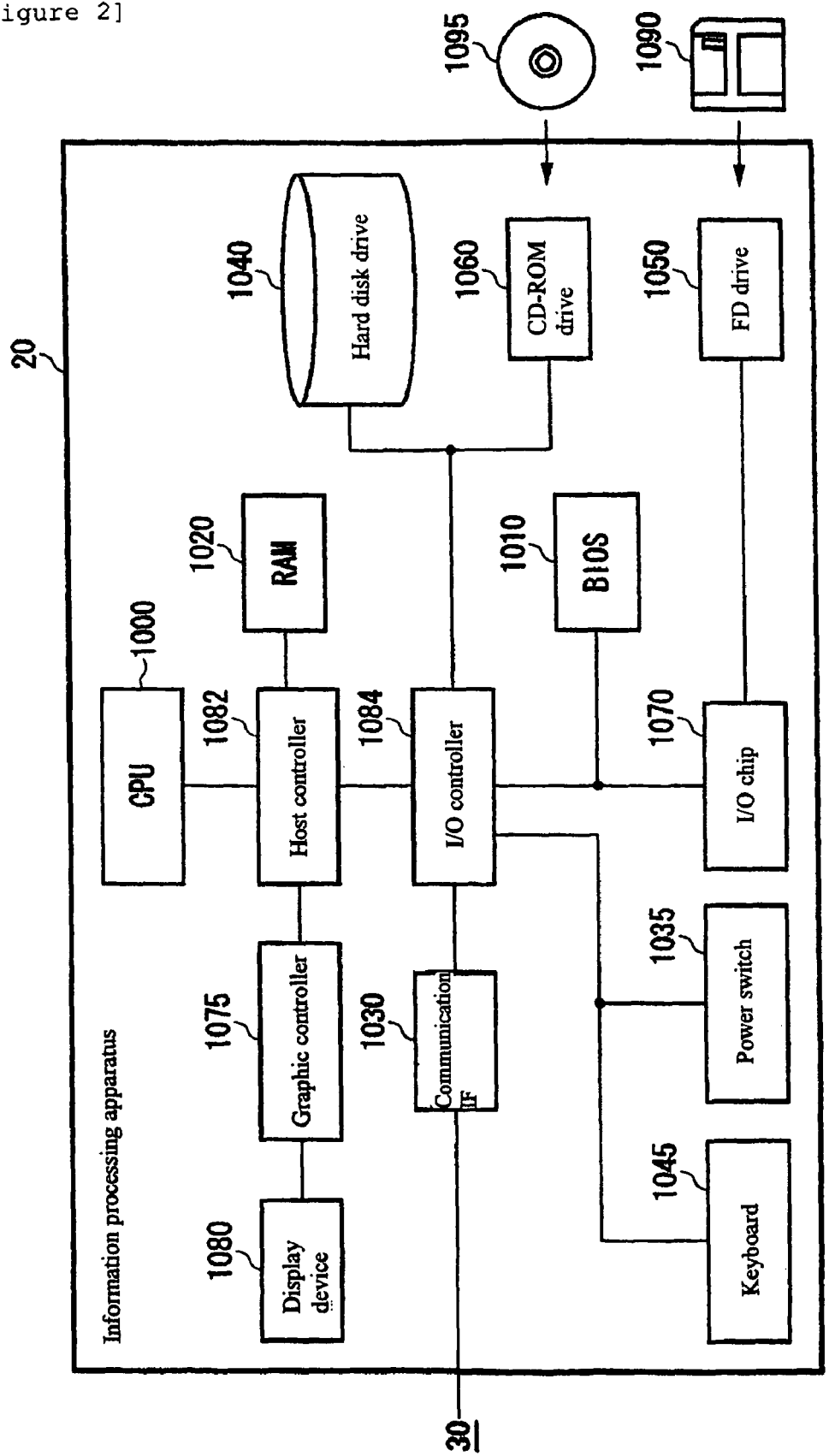

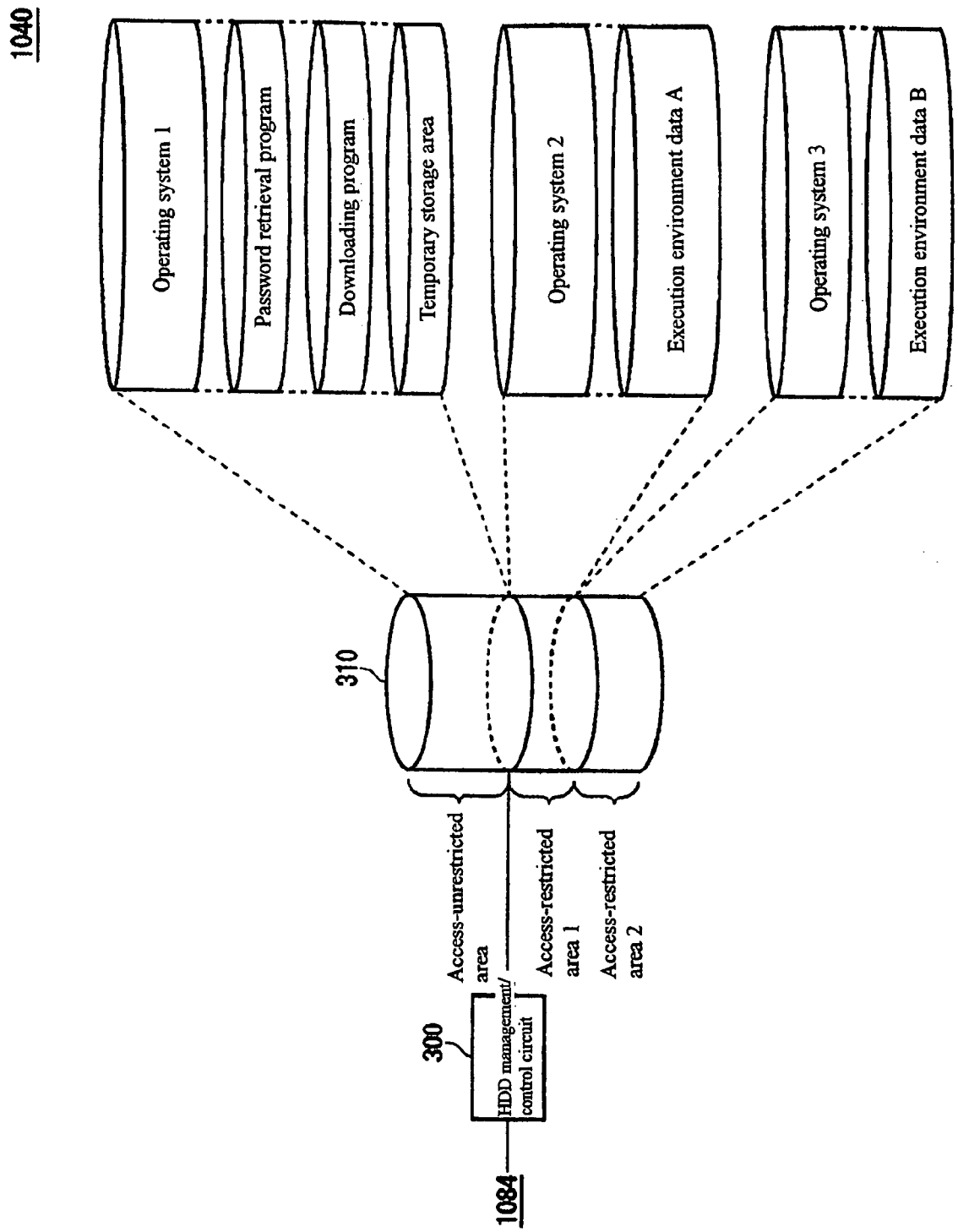
[Figure 3]

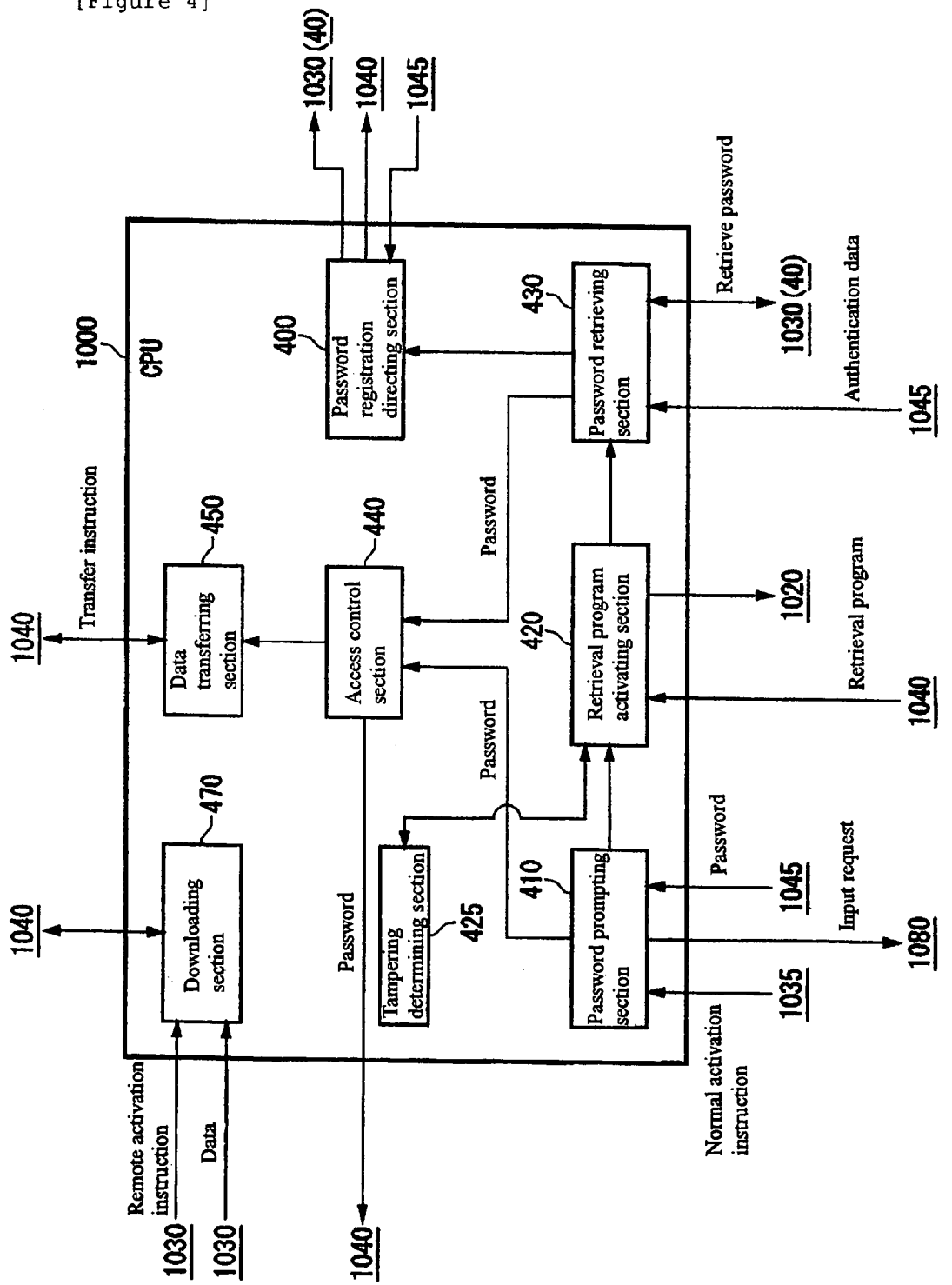
[Figure 4]

[Figure 5]
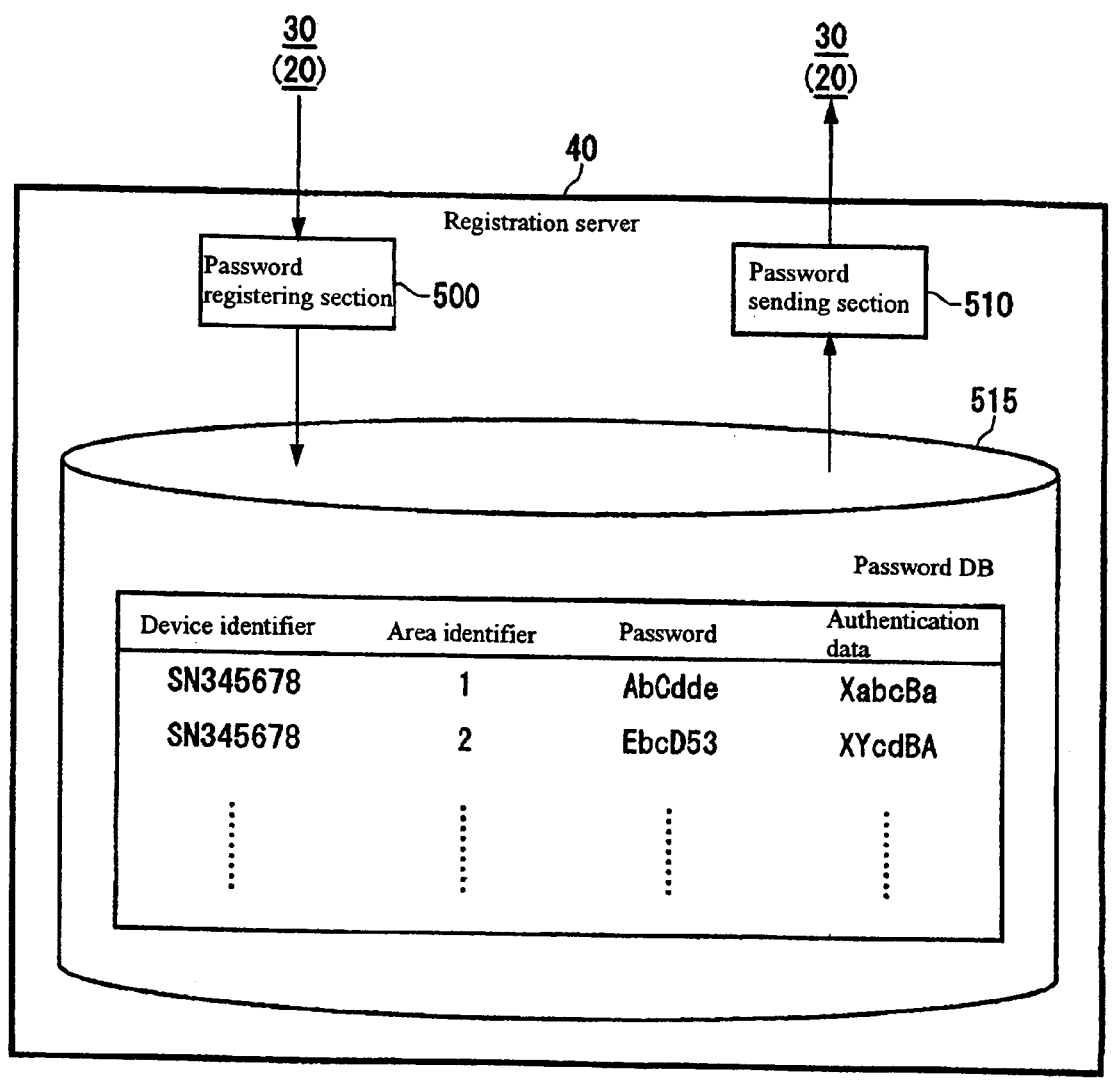

[Figure 6]
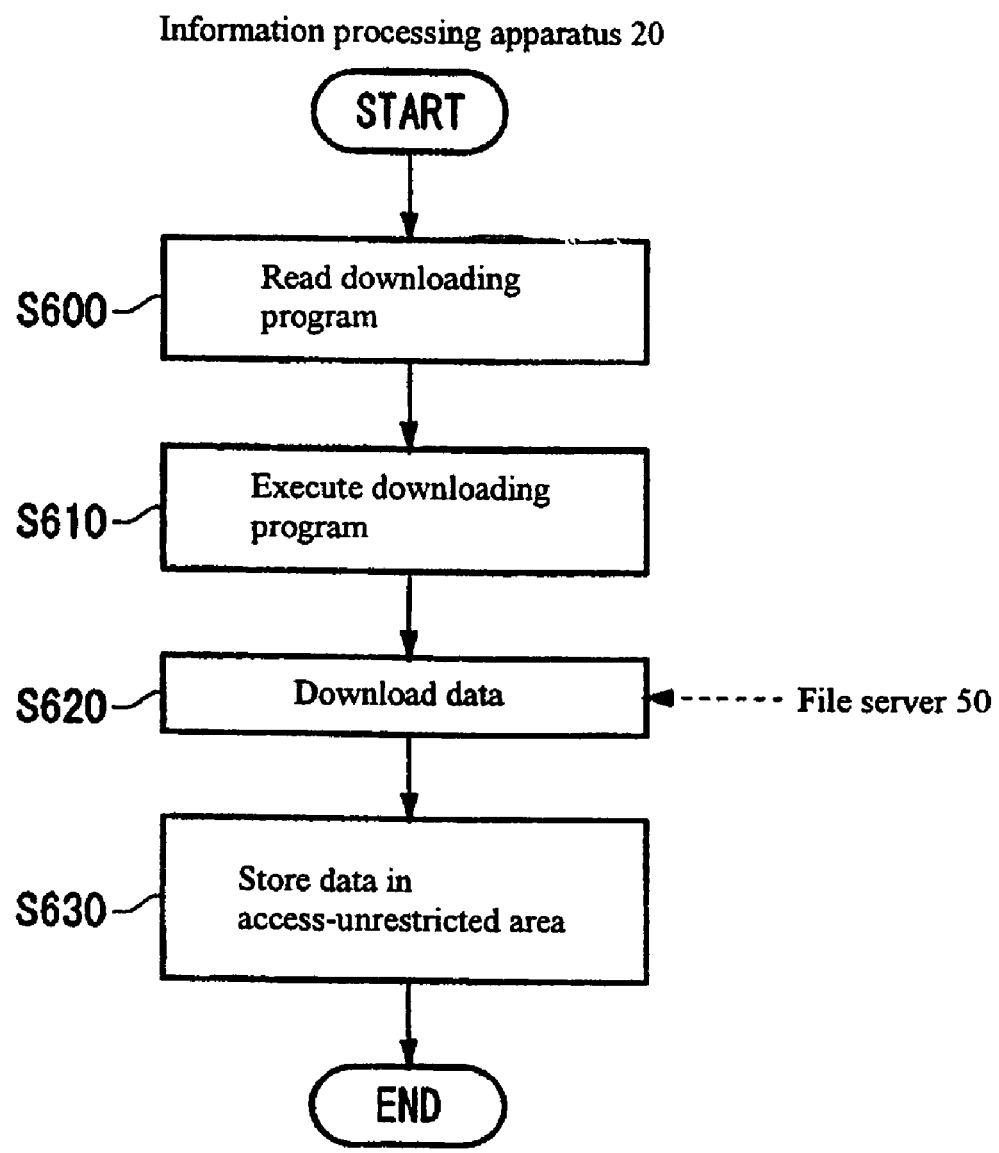

[Figure 7]
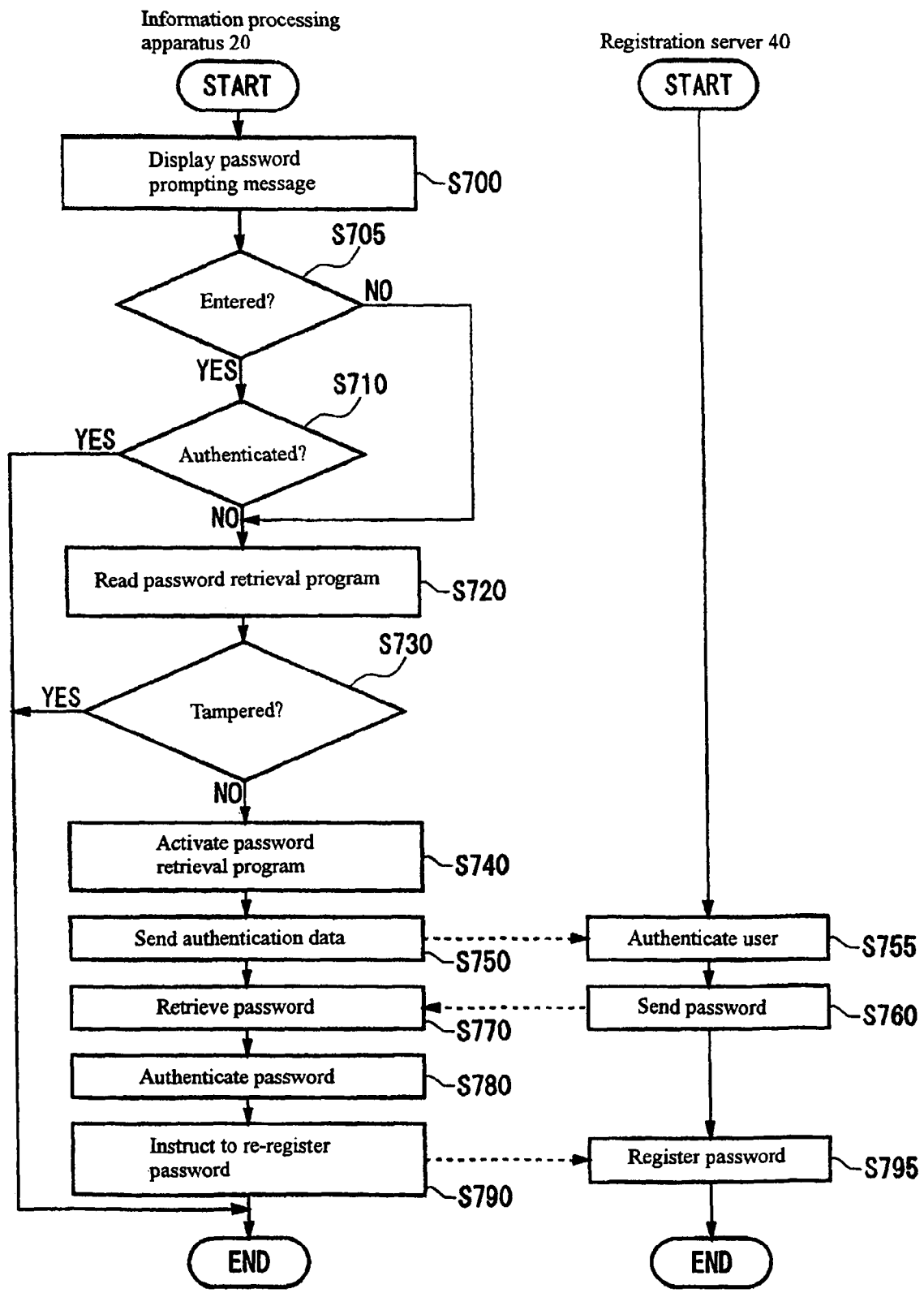

[Figure 8]
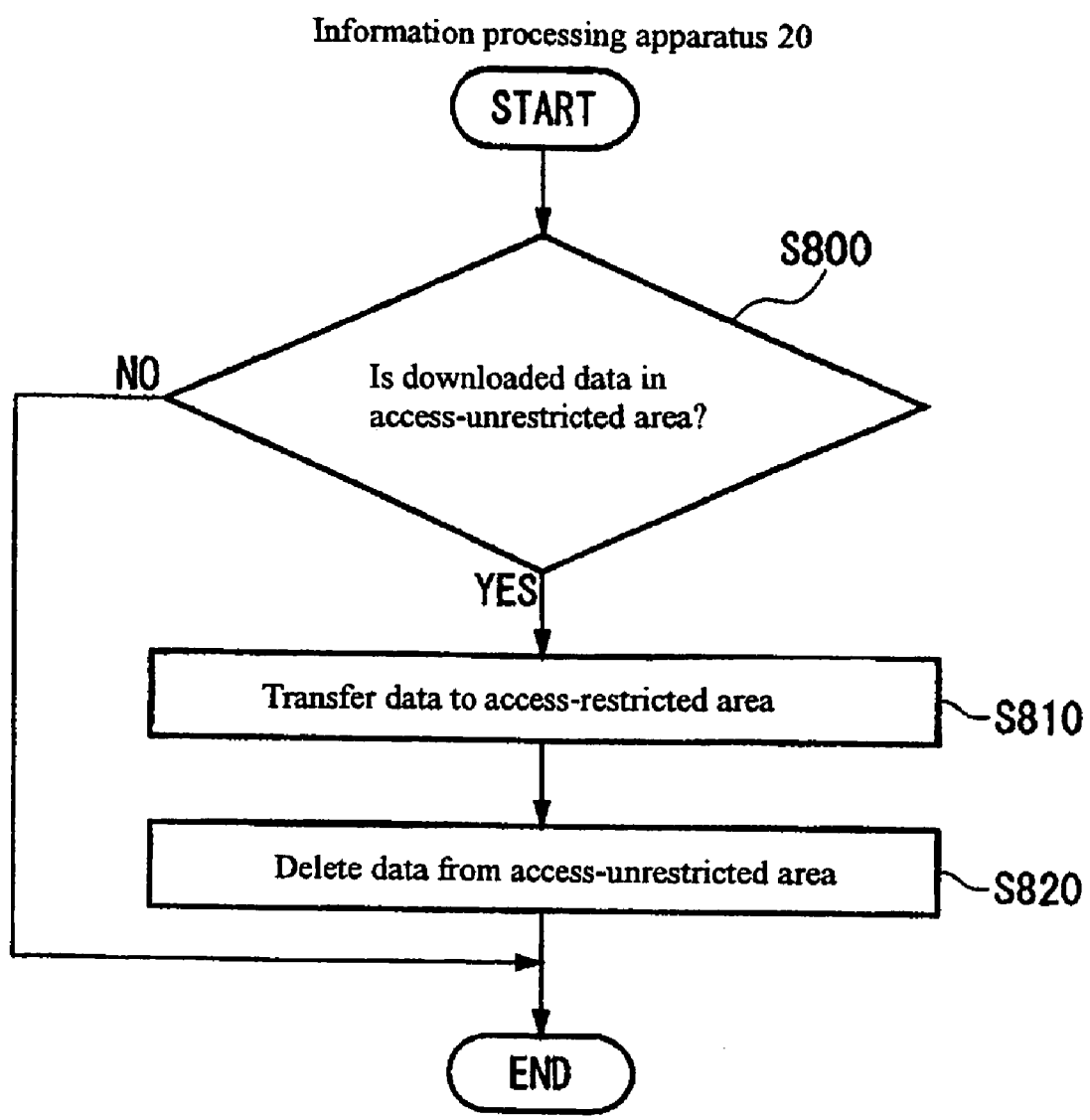

SECURE AND CONVENIENT ACCESS CONTROL FOR STORAGE DEVICES SUPPORTING PASSWORDS FOR INDIVIDUAL PARTITIONS

BACKGROUND OF THE INVENTION

The present invention relates to an information processing system, an information processing apparatus, a registration server, a control program, and a control method. In particular, the present invention relates to an information processing system, an information processing apparatus, a registration server, a control program, and a control method that protect data by means of password authentication.

There is a method for managing personal data of each of users sharing the same information processing apparatus to prevent the personal data from being referred to by the other users by using a management function of an system (hereinafter referred to as the OS). For example, an OS controls access to a storage area in which personal data is stored and permits access to the storage area only if a password is entered. Also, a file encryption tool can be used to encrypt and store a file in a manner that the file can be decrypted only if a password is entered.

However, in relatively small companies, it is often the case that the authority of an OS administrator is not clearly defined and one of the users sharing an information processing apparatus also serves as the OS administrator. Furthermore, an administrator may accidentally install spyware that performs keyboard logging or the like, depending on the administrator's ability and knowledge. Consequently, the passwords or personal data of the users sharing the information processing apparatus can be read or tampered by another sharing user.

The capability of recording a history of access to personal data can be set to watch for unauthorized access. However, if a password itself is stolen, it is difficult to separate a tiny number of records of unauthorized access from the records of authorized access. Furthermore, it would be a burden to the users to frequently check the access history. Although various other means may be possible, it is inherently difficult to ensure privacy of personal data in a system in which the OS administrator has control over all the authority on the information processing apparatus.

On the other hand, a technology has been used that sets a password for controlling access to a hard disk drive (hereinafter referred to as an HDD). Because a password set to an HDD is recorded on the HDD in a dispersed manner according to a certain algorithm when the password is set, it is difficult to perform unauthorized reading of the password. Unlike a password managed by an OS, authentication of the password set to the HDD is performed before activation of the OS. If the password is authenticated, the HDD is made accessible and the OS is activated. Therefore, even the OS administrator cannot access data in the HDD without knowledge of the password for the HDD.

Patent Document 1 will be referred to below.
[Patent Document 1] Laid-Open Japanese Patent Application No. 2000-215167

When executing the following two application programs, a user cannot enter an HDD password. Therefore access to the HDD remains prohibited and these programs are activated in limited ways.

(1) A service for resetting an HDD password of a user if the user forgets the HDD password (2) A service for delivering a certain file from a remote server over a network through the use of remote activation (see Patent Document 1, for example)

Because it is essentially of no use to store these service programs in an HDD, they may be stored in a non-volatile memory, such as a ROM, other than the HDD. However, it is not cost effective to make a ROM, which has a limited code storage capacity, accommodate the size of the programs that require to implement complicated functions, such as a network connection function and multi-language supporting function, for providing the above-mentioned services. Another known solution that does not use an HDD is to transfer a required program itself from a PXE (Preboot eXecution Environment) server provided in the same subnetwork within a LAN to a main memory in an information processing apparatus and activates the program. However, there are problems in that installation and maintenance costs for the PXE server are required and that such a program activation method cannot be used in a network environment in which no PXE server is provided. Further, even if a PXE server can be used to solve the problem of activating the program for performing the service mentioned under item (2), there remains another essential problem that no location is available to store or save a file delivered by the service in a state where access to a local HDD is prohibited.

There is another solution to the condition in which a user cannot enter an HDD password. An HDD password, which would otherwise be stored only in an HDD, is backed up onto a non-volatile memory (such as a battery-backup CMOS or EEPROM) on a system board that is accessible to a BIOS code. According to this method, the HDD can be made accessible by sending the HDD password to the HDD by the BIOS itself if the user cannot enter the HDD password. Furthermore, most personal computers include, in addition to a password for restricting access to an HDD (HDD password), a power-on password (POP) by which a BIOS itself restricts activation of the system. Therefore, in some cases, the same character string is used as the POP and HDD password to provide the backup function described above. That is, this approach tries to solve the problem on the basis of password usage by recommending the user to set the same character string as both the POP and HDD passwords in order to implement the service mentioned under item (2).

However, a malicious third party can insert a special cable that provides electrical interface between the HDD and the motherboard of the main unit which are interconnected through a connector and wiretap an HDD password which is automatically transmitted at an expected timing of remote activation, by abusing the function of the BIOS's function of automatically reading the same HDD password from the backup area and sending it to the HDD even if the user does not directly enter the password. Therefore, the solutions using HDD password backup are risky in terms of security. A POP can easily be read from a non-volatile memory on an internal motherboard by opening up the housing of the system, bring a commercially-available instrument such as a locator into direct contact with a specific position of the non-volatile memory, and electrically accessing it. In contrast, special security considerations are given to an HDD password as described above. That is, the security reliability of an HDD password inherently differs from that of a POP, which is protected from being accessed from other software codes simply by restricting access to the POP to BIOS codes. Therefore, the above-described solution in which the user uses the same character string for both HDD password and POP reduces the security level of the HDD password to that of the POP, leading to a crucial problem of decreasing the security level of the entire system.

SUMMARY OF THE INVENTION

Therefore, a purpose of the present invention is to provide an information processing system, an information processing apparatus, a registration server, a control program, and a control method that can solve these problems. The purpose is achieved by a combination of features set forth in the independent claims. The dependent claims define further advantageous specific embodiments.

In order to solve the previously stated problems, a first aspect of the present invention provides an information processing system, an information processing apparatus and a registration server included in the information processing system, a control method for controlling the information processing apparatus, and a control program for controlling the information processing apparatus, wherein the information processing system includes the information processing apparatus having an external storage device, and the registration server for registering a password set to the external storage device, and the information processing apparatus includes: an external storage device having an access-restricted area accessible on condition that the password is properly authenticated and an access-unrestricted area accessible regardless of whether or not the password is authenticated; a password registration directing section for directing the registration server to register the password in the registration server beforehand; a password prompting section for prompting a user to enter the password in response to accessing the access-restricted area; a password retrieval program activating section for reading from the access-unrestricted area a password retrieval program which retrieves the password from the registration server and activating the password retrieval program, on condition that the password is not properly authenticated; a password retrieving section for retrieving the password from the registration server by running the password retrieval program; and an access controlling section for placing the access-restricted area in an accessible state by causing the external storage device to authenticate the retrieved password; and the registration server includes: a password registering section for registering the password; and a password sending section for sending the registered password to the information processing apparatus.

According to a second aspect of the present invention, there is provided an information processing apparatus, a control method for controlling the information processing apparatus, and a control program for controlling the information processing apparatus, wherein the information processing apparatus includes: an external storage device having an access-restricted area accessible on condition that the password is properly authenticated and an access-unrestricted area accessible regardless of whether or not the password is authenticated; a downloading section for downloading data over a communication link and storing the data in the access-unrestricted area on condition that a remote activation instruction through the communication link is received; a password prompting section for prompting a user to enter the password on condition that the user locally performs a normal activation; an access controlling section for placing the access-restricted area in an accessible state by causing the external storage device to authenticate the entered password; and a data transferring section for reading the data from the access-unrestricted area and storing the data in the access-restricted area on condition that the access-restricted area is placed in an accessible state and the access-unrestricted area already stores the data.

This summary does not enumerate all essential features of any particular embodiment of the present invention. Subcombinations of the features may also constitute specific embodiments of the present invention.

According to the various aspects of the present invention, a particular area of a hard disk drive can be protected by password authentication while the other areas not protected by password authentication can be put to effective use.

BRIEF DESCRIPTION OF THE DRAWINGS

Some of the purposes of the invention having been stated, others will appear as the description proceeds, when taken in connection with the accompanying drawings, in which:

FIG. 1 schematically shows a general configuration of an information processing system 10;

FIG. 2 shows a configuration of an information processing apparatus 20;

FIG. 3 shows a configuration of a hard disk drive 1040;

FIG. 4 shows functions of a CPU 1000 classified into functional blocks;

FIG. 5 shows a configuration of a registration server 40;

FIG. 6 shows a process performed when the information processing apparatus 20 has received a remote activation instruction;

FIG. 7 shows a process performed when the information processing apparatus 20 has received a normal activation instruction; and FIG. 8 shows a process performed when an access-restricted area has made accessible.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention. While one or more embodiments are shown, the embodiments are not intended to limit the present invention which is defined in the claims and not all of the combinations of features described in the embodiments are essential to the inventive solution.

Referring now more particularly to the accompanying drawings, in which like numerals indicate like elements or steps throughout the several views, FIG. 1 schematically shows an information processing system 10. The information processing system 10 includes an information processing apparatus 20, a registration server 40 and a file server 50. The information processing apparatus 20 is connected to the registration server 40 and the file server 50 through a communication link such as a network 30, for example. The registration server 40 in the information processing system 10 according to an embodiment of the present invention registers in advance a password set to a hard disk drive of the information processing apparatus 20. If a user of the information processing apparatus 20 is authenticated, the registration server 40 sends the password to the information processing apparatus 20. A first purpose of the present invention is to thus place the hard disk drive of the information processing apparatus 20 in an accessible state even if the user forgets the password.

The information processing system 10 according to the present embodiment reads and executes a program from an access-unrestricted area in the hard disk drive of the information processing apparatus 20 that is accessible regardless of whether or not the password is authenticated if the information processing apparatus 20 receives a remote activation instruction that instructs activation through the network 30. This program downloads data from the file server 50, for example, and stores the downloaded data in the access-unrestricted area. Then, a user locally performs a normal activation to enter a password, in other words, a user activates the information processing apparatus 20 in a normal manner to enter a password, the password is authenticated, and the data is transferred from the access-unrestricted area to an access-restricted area. A second embodiment of the present invention is to thus activate the information processing apparatus 20 and cause it to download data even if the user cannot enter the password because the user is in a remote place.

FIG. 2 shows a configuration of the information processing apparatus 20. The information processing apparatus 20 includes a CPU section including a CPU 1000, a RAM 1020, and a graphic controller 1075, which are interconnected through a host controller 1082. The information processing apparatus 20 also includes an input-output section including a communication interface 1030, a power switch 1035, a hard disk drive 1040, a keyboard 1045, and a CD-ROM drive 1060, which are connected to the host controller 1082 through an input-output controller 1084. The information processing apparatus 20 also includes a legacy input-output section including a BIOS 1010, a flexible disk drive 1050, and input-output chip 1070, which are connected to the input-output controller 1084.

The host controller 1082 connects the RAM 1020 with the CPU 1000 and the graphic controller 1075, which access the RAM 1020 at higher transfer rates. The CPU 1000 operates according to programs stored in the BIOS 1010 and the RAM 1020 to control components of the computer. The graphic controller 1075 obtains image data generated by the CPU 1000 or the like on a frame buffer provided in the RAM 1020 and causes it to be displayed on a display device 1080. Alternatively, the graphic controller 1075 may contain a frame buffer for storing image data generated by the CPU 1000.

The input-output controller 1084 connects the host controller 1082 with the communication interface 1030, the hard disk drive 1040, and the CD-ROM drive 1060, which are relatively fast input/output devices. The communication interface 1030 communicates with external devices through a wireless or wire network. When depressed by a user, the power switch 1035 turns on power to the information processing apparatus 20. The hard disk drive 1040 stores programs and data used by the information processing apparatus 20. The keyboard 1045 receives input of character strings or other information and sends the result of the input to the CPU 1000. The CD-ROM drive 1060 reads a control program or data from a CD-ROM 1095 and stores it in the RAM 1020 through the input-output controller 1084.

Connected to the input-output controller 1084 are relatively slow input/output devices such as the BIOS 1010 and the input-output chip 1070. The BIOS 1010, which is non-volatile memory such as a ROM, stores a BIOS program which is read and executed to initialize devises provided in the information processing apparatus 20 and activates an OS on reception of a normal activation instruction provided in response to depression of the power switch 1035. Connected to the input-output chip 1070 is the flexible disk drive 1050. The flexible disk drive 1050 reads a program or data from a flexible disk 1090 and stores it in the RAM 1020 through the input-output chip 1070 and the input-output controller 1084.

Connected to the input-output chip 1070 are a flexible disk 1090 and input-output devices through ports such as a parallel port, serial port, keyboard port, and mouse port, for example. The control program to be provided to the information processing apparatus 20 is stored on a recording medium such as a flexible disk 1090, a CD-ROM 1095, or an IC card and provided by a user. The control program is read from the recording medium, installed in the information processing apparatus 20 through the input-output chip 1070 and/or the input-output controller 1084. The control program read may be sent to the registration server 40 through the network 30 and installed and executed on the registration server 40.

The control program mentioned above may be stored on an external storage medium or any computer readable storage medium. The storage medium may be a flexible disk 1090 or a CD-ROM 1095, or an optical recording medium such as a DVD and PD, a magneto-optical recording medium such as an MD, a tape medium, or a semiconductor memory such as an IC card. Alternatively, a storage device such as a hard disk or a RAM provided in a server system connected to a private communication network or the Internet may be used as the recording medium and the control program may be provided from the storage device to the information processing apparatus 20 over the network 30.

FIG. 3 shows a configuration of the hard disk drive 1040. The hard disk drive 1040 has an HDD management/control circuit 300 and a recording medium 310. The HDD management/control circuit 300 reads or writes an access-restricted area on a recording medium 310 in response to an access request received from the input-output controller 1084 if a password is properly authenticated. On the other hand, if a password is not properly authenticated, the HDD management/control circuit 300 prohibits data from being written into or read from the access-restricted area. The HDD management/control circuit 300 reads or writes an access-unrestricted area of the recording medium 310 in response to an access request from the input-output controller 1084, regardless whether a password is authenticated or not.

The hard disk drive 1040 is an example of an external storage device according to the present invention and may be a single hard disk drive unit, for example. Each of the access-unrestricted area and the access-restricted areas is at least one of the partitions provided by logically dividing the hard disk drive 1040. Alternatively, the external storage device may be a disk array consisting of a combination of a number of hard disk drive apparatuses. In that case, each of the access-unrestricted and restricted areas may include at least one entire hard disk drive.

The recording medium 310 has an access-unrestricted area and a number of access-restricted areas. In particular, the recording medium 310 has in the access-unrestricted area operating system 1, a password retrieval program which obtains a password from the registration server 40, a downloading program which obtains data from the file server 50 through the network 30, and a temporary storage area which stores downloaded data.

The recording medium 310 has operating system 2 and execution environment data A which defines an execution environment for operating system 2 in access-restricted area 1. Also, the recording medium 310 has operating system 3 and execution environment data B that defines an execution environment for operating system 3 in access-restricted area 2.

In this way, the recording medium 310 stores the OS not only in the access-restricted areas but also in the access-unrestricted area. Accordingly, the OS in the access-unrestricted area can be read and activated to cause application programs on the OS to perform various processes if a password is not properly authenticated. The recording medium 310 stores one OS and its execution environment in one access-restricted area. Accordingly, multiple users can use their own OS mutually exclusively and manage their personal data in such a way that the data is invisible to the other users.

Instead of the configuration shown in FIG. 3, a configuration may be provided in which the access-restricted area contains only execution environment data, but not an OS itself. In that case, the access-unrestricted area may store the OS common to the execution environment data. If OSs and their execution environments can be positively distinguished from each other, this configuration can save occupied space on the recording medium 310.

FIG. 4 shows functions of the CPU 1000 classified into functional blocks which, as is well known, may be implemented in hardware, software, and combinations thereof. However, in the embodiment shown, the functional blocks are implemented in software as a control program installed in the information processing apparatus 20 which causes the CPU 1000 to act as a password registration directing section 400, a password prompting section 410, a retrieval program activating section 420, a tampering determining section 425, a password retrieving section 430, an access control section 440, a data transferring section 450, and downloading section 470. The password registration directing section 400 sets a password entered through the keyboard 1045 to the hard disk drive 1040. Then, the password registration directing section 400 sends the password set to the hard disk drive 1040 to the registration server 40 through the communication interface 1030 to pre-register it with the registration server 40.

The password prompting section 410 prompts a user to enter a password when the user accesses an access-restricted area. For example, when a user performs a normal activation and the password prompting section 410 receives a normal activation instruction, which is provided through the use of the power switch 1035 rather than the network 30, the password prompting section 410 prompts a user to enter a password and displays a password entry panel on the display device 1080 in order to activate operating system 2 from access-restricted area 1. When the password prompting section 410 has received a password, the password prompting section 410 sends the password to the access control section 440.

The retrieval program activating section 420 reads a password retrieval program from the access-unrestricted area of the hard disk drive 1040 into the RAM 1020 if the password is not properly authenticated. The tampering determining section 425 determines from a digital signature attached to the password retrieval program whether or not the password retrieval program has been tampered. If the password retrieval program has not been tampered, the retrieval program activating section 420 activates the password retrieval program.

The password retrieving section 430 cause the password retrieval program to operate to retrieve a password from the registration server 40 and sends it to the access control section 440 if a user of the information processing apparatus 20 is authenticated by the registration server 40. Preferably, the password retrieving section 430 instructs the password registration directing section 400 to change and reregister the password. The access control section 440 causes the hard disk drive 1040 to authenticate a password retrieved or entered to place an access-restricted area in an accessible state.

The data transferring section 450 reads data from an access-unrestricted area and stores it in an access-restricted area if the access-restricted area is in an accessible state and the data has been stored in the access-unrestricted area. The downloading section 470 stores data over a communication link and stores it in an access-unrestricted area if a remote activation instruction which instructs activation over the communication link.

FIG. 5 shows a configuration of the registration server 40. The registration server 40 has a password registering section 500, a password sending section 510, and a password database 515. The password registering section 500 registers a password set to an access-restricted area of the hard disk drive 1040 in the password database 515. In particular, the password registering section 500 associates and registers a password set to an access-restricted area with device identification information that identifies the hard disk drive 1040 and area identification information that identifies that access-restricted area. The password registering section 500 also associates and registers authentication data for authenticating the owner of the registered password with the password.

The password sending section 510 sends a password registered in the password database 515 to the information processing apparatus 20 if a user of the information processing apparatus 20 is authenticated. For example, the password sending section 510 receives another password for authenticating a user of the information processing apparatus 20 from the information processing apparatus 20 and determines whether the password matches registered authentication data. If the password matches, the password sending section 510 sends a password associated with the authentication data to the information processing apparatus 20. Thus, the hard disk drive 1040 authenticates the password sent and makes the access-restricted area accessible.

FIG. 6 shows a process performed when the information processing apparatus 20 has received a remote activation instruction. On reception of a remote activation instruction, the downloading section 470 reads the downloading program from the access-unrestricted area (S600). The downloading section 470 then executes the downloading program (S610) to download data from the file server 50 over the communication link (S620). Then, the downloading section 470 stores the downloaded data in a temporary storage area in the access-unrestricted area (S630).

FIG. 7 shows a process performed when the user performs a normal activation and the information processing apparatus 20 has received a normal activation instruction. On reception of a normal activation instruction, the information processing apparatus 20 executes a BIOS program to perform the following process. First, the password prompting section 410 displays a password prompting message on the display device 1080 to prompt a user to enter a password (S700). If the hard disk drive 1040 includes more than one access-restricted area, the password prompting section 410 prompts the user to enter a password for the access-restricted area among the access-restricted areas that is specified by the user.

If no password is entered (S705: No) or the password is not properly authenticated (S710: No), the retrieval program activating section 420 reads the password retrieval program from the access-unrestricted area of the hard disk drive 1040 (S720). The tampering determining section 425 determines from a digital signature added to the password retrieval program whether or not the password retrieval program has been tampered with (S730). If the password retrieval program has not been tampered with (S730: No), the retrieval program activating section 420 activates the password retrieval program (S740).

The password retrieving section 430 executes the password retrieval program to perform steps S750 and S770. Specifically, the password retrieving section 430 associates authentication data for authenticating the user of the information processing apparatus 20 with device identification information identifying the hard disk drive 1040 and area identification information specified by the user (if any) and sends them to the registration server 40 (S750). For example, the password retrieving section 430 may prompt the user to enter another password for authenticating the user and send the entered password to the registration server 40. The password for authenticating the user may be a password for the user to log in a LAN or a password for a groupware in which the user is participating.

The password sending section 510 authenticates the user of the information processing apparatus 20 (S755) and sends to the information processing apparatus 20 the password associated with the device identification information and area identification information sent at S750 (S760). On condition that the user of the information processing apparatus 20 is authenticated by the registration server 40, the password retrieving section 430 retrieves the password associated with the device identification information and area identification information sent at S750 from the registration server 40 (S770).

The access control section 440 allows the hard disk drive 1040 to authenticate the retrieved password to place the access-restricted area in an accessible state (S780). Then, the password registration directing section 400 requests the user to enter a new password, sets the entered password to the hard disk drive 1040, and registers the password with the registration server 40 (S790). In response to this, the password registering section 500 registers the password in the password database 515 (S795).

For a hard disk drive having an IDE interface as specified in the ATA specifications, two passwords can be set. A hard disk drive for which two passwords are set permits access if one of the passwords is authenticated. Therefore, the user may assign one of the password as a user-memorized password and the other as a password to be registered with the registration server 40. This can eliminate the process for registering, in the registration server 40, a user-memorized password changed by the user even if the user changes the password for user storage.

Furthermore, the registration server 40 may also register secret information concerning the information processing apparatus, such a power-on password, in addition to the password for the hard disk. This allows a user authenticated by the registration server 40 to properly activate the information processing apparatus 20 if the user forgets the power-on password.

As has been described with reference to FIG. 7, on reception of a normal activation instruction, the access control section 440 causes the hard disk drive 1040 to authenticates a password to place an access-restricted area in an accessible state. This allows only a user who knows a valid password, or a user who authenticates through registration server 40, to access the access-restricted area.

FIG. 8 shows a process performed after an access-restricted area is made accessible. When an access-restricted area becomes accessible, the information processing apparatus 20 reads and activates operation system 2 from access-restricted area 1 and performs the following process. Specifically, the data transferring section 450 first determines whether downloaded data is stored in an access-unrestricted area (S800). If so (S800: Yes), the data transferring section 450 transfers the data to the access-restricted area (S810). Then, the data transferring section 450 deletes the data from the access-unrestricted area (S820).

According to the present embodiment, a password for permitting access can be selected for each individual partition of the hard disk drive 1040. Consequently, a program to be executed when a password is not properly authenticated can be stored in an access-unrestricted area in the hard disk drive 1040 the capacity of which is larger than that of a ROM chip such as a BIOS 1010. Thus, when activation is to be performed in response a remote activation instruction and therefore password cannot be entered through the keyboard, the OS in the access-unrestricted area can be activated and data can be downloaded. Furthermore, if a user forgets his/her password, the OS in the access-unrestricted area can be activated to perform communication with the registration server 40, thereby performing user authentication.

In the drawings and specifications there has been set forth a preferred embodiment of the invention and, although specific terms are used, the description thus given uses terminology in a generic and descriptive sense only and not for purposes of limitation.

What is claimed is:

1. An apparatus comprising:
    a storage device having:
        a plurality of access-restricted areas, wherein an access-restricted area comprises a portion of a hard disk drive having a user-specific execution environment accessible on condition that a password of a user assigned to the access-restricted area is properly authenticated;
        and an access-unrestricted area, wherein the access-unrestricted area comprises another portion of the hard disk drive having an unrestricted execution environment and a password retrieval program therein, the access-unrestricted area being accessible by the one or more users regardless of whether a password of a user assigned to the access-restricted area is authenticated;
    a password registration director which directs a registration server to register one or more passwords of users assigned to the plurality of access-restricted areas in the registration server;
    a password prompter which prompts a user to enter a password in response to the user attempting to access an access-restricted area;
    a password retrieval program activator which reads from the access-unrestricted area a password retrieval program which retrieves a password from the registration server and activates the password retrieval program, on condition that an entered password is not properly authenticated;
    a password retriever which retrieves a password from the registration server by running the password retrieval program; and
    an access controller which places an access-restricted area in an accessible state by causing the storage device to authenticate the retrieved password.

2. A product comprising:
    a computer readable storage device having computer readable program code stored therein for operating an information processing apparatus having a storage device having a plurality of access-restricted areas, an access-restricted area comprising a portion of a hard disk drive having a user-specific execution environment accessible on condition that a password is properly authenticated and an access-unrestricted area, the access-unrestricted area comprising another portion of the hard disk having an unrestricted execution environment and a password retrieval program stored therein, the access-unrestricted area being accessible regardless of whether the password is authenticated, the computer readable program code in said product being effective to:
    direct a registration server to register a password in the registration server;
    prompt a user to enter the password in response to attempting to access an access-restricted area;
    read from the access-unrestricted area a password retrieval program which retrieves the password from the registration server and activate the password retrieval program on condition that the password is not properly authenticated;

retrieve the password from the registration server by running the password retrieval program; and place an access-restricted area in an accessible state by causing the storage device to authenticate the retrieved password.

3. A method comprising:

directing a registration server to register a password in the registration server, the password being useable in an information processing apparatus having a storage device having a plurality of access-restricted areas, an access-restricted area comprising a portion of a hard disk drive having a user-specific execution environment which is accessible on condition that the password is properly authenticated and an access-unrestricted area comprising another portion of the hard disk drive having an unrestricted execution environment and a password retrieval program therein and which is accessible regardless of whether the password is authenticated;

prompting a user to enter a password in response to the user attempting to access an access-restricted area;

reading from the access-unrestricted area the password retrieval program which retrieves the password from the registration server and activating the password retrieval program, on condition that the password is not properly authenticated;

retrieving the password from the registration server by running the password retrieval program; and placing an access-restricted area in an accessible state by causing the storage device to authenticate the retrieved password.

4. The method according to claim 3, wherein the hard disk drive comprises an array of hard disk drives.

* * * * *